United States Patent
Pison et al.

(10) Patent No.: US 8,977,317 B2
(45) Date of Patent: Mar. 10, 2015

(54) METHOD OF CONFIGURING MODULES FOR IDENTIFYING USERS OF A TELECOMMUNICATION NETWORK

(75) Inventors: Laurent Pison, Jouars-Ponchartrain (FR); Olivier Paterour, Guyancourt (FR); Gérard Marque-Pucheu, Verneuil (FR)

(73) Assignee: Cassidian SAS, Elancourt (FR)

( * ) Notice: Subject to any disclaimer, the term of this patent is extended or adjusted under 35 U.S.C. 154(b) by 104 days.

(21) Appl. No.: 13/642,083

(22) PCT Filed: Feb. 25, 2011

(86) PCT No.: PCT/EP2011/052860
§ 371 (c)(1),
(2), (4) Date: Oct. 18, 2012

(87) PCT Pub. No.: WO2011/131397
PCT Pub. Date: Oct. 27, 2011

(65) Prior Publication Data
US 2013/0035136 A1    Feb. 7, 2013

(30) Foreign Application Priority Data

Apr. 20, 2010   (FR) ..................... 10 53013

(51) Int. Cl.
*H04W 88/02*    (2009.01)
*H04W 8/26*    (2009.01)
(52) U.S. Cl.
CPC ..................... *H04W 8/26* (2013.01)
USPC ........................................... 455/558; 709/249
(58) Field of Classification Search
USPC .............. 455/403, 411, 414.1, 435.1–435.3
See application file for complete search history.

(56) References Cited

U.S. PATENT DOCUMENTS

2003/0208628 A1* 11/2003 Karjanlahti ................... 709/249

OTHER PUBLICATIONS

International Search Report as issued for PCT/EP2011/052860.
Johnson; "Assignment of Codes for United Nations Disaster Relief Activities"; Itu, May 4, 2007; pp. 1-2; XP002612090.
"Report to ITU Study Group 2: E.164 United Nations Country Code"; IASC Sub-Working Group on Emergency Telecommunications (WGET); Jan. 2007, pp. 1-5; XP002612091.
"ITU-T E.212: International Operation Maritime Mobile Service and Public Land Mobile Service: The International Identification Plan for Public Networks and Subscriptions"; ITU-T Series E: Overall network operation, telephone services, service operation and human factors, ITU-T Recommendation E.212, May 2008; XP002611801, Switzerland, Geneva 2005.

(Continued)

*Primary Examiner* — Kashif Siddiqui
(74) *Attorney, Agent, or Firm* — Pillsbury Winthrop Shaw Pittman LLP

(57) ABSTRACT

A method of configuring modules for identifying users of a telecommunication network able to cover a service area, each identification module including an identification code stored in the identification module, the identification code including: an operator identifier; a user identification number; the method includes assigning a same operator identifier to a plurality of modules for identifying users belonging to a same organization or international mission.

8 Claims, 1 Drawing Sheet

(56) References Cited

OTHER PUBLICATIONS

"Terrestrial Trunked Radio (TETRA); Voice plus Data (V+D); Designers guide; Part 5: Guidance on numbering and addressing", Technical Report, European Telecommunications Standards Institute (ETSI), 650, Route Des Lucioles, F-06921 Sophia-Antipolis, France, vol. TETRA 3; No. V1.3.1; Mar. 1, 2010; XP014046262.

"ITU-T E.218: International Operation Maritime Mobile Service and Public Land Mobile Service: Management of Allocation of Terrestrial Trunk Radio Mobile Country Codes", ITU-T Series E; Overall network operation, telephone services, service operation and human factors ITU-T Recommendation E.218, May 2004; XP002612092, Switzerland, Geneva 2004.

* cited by examiner

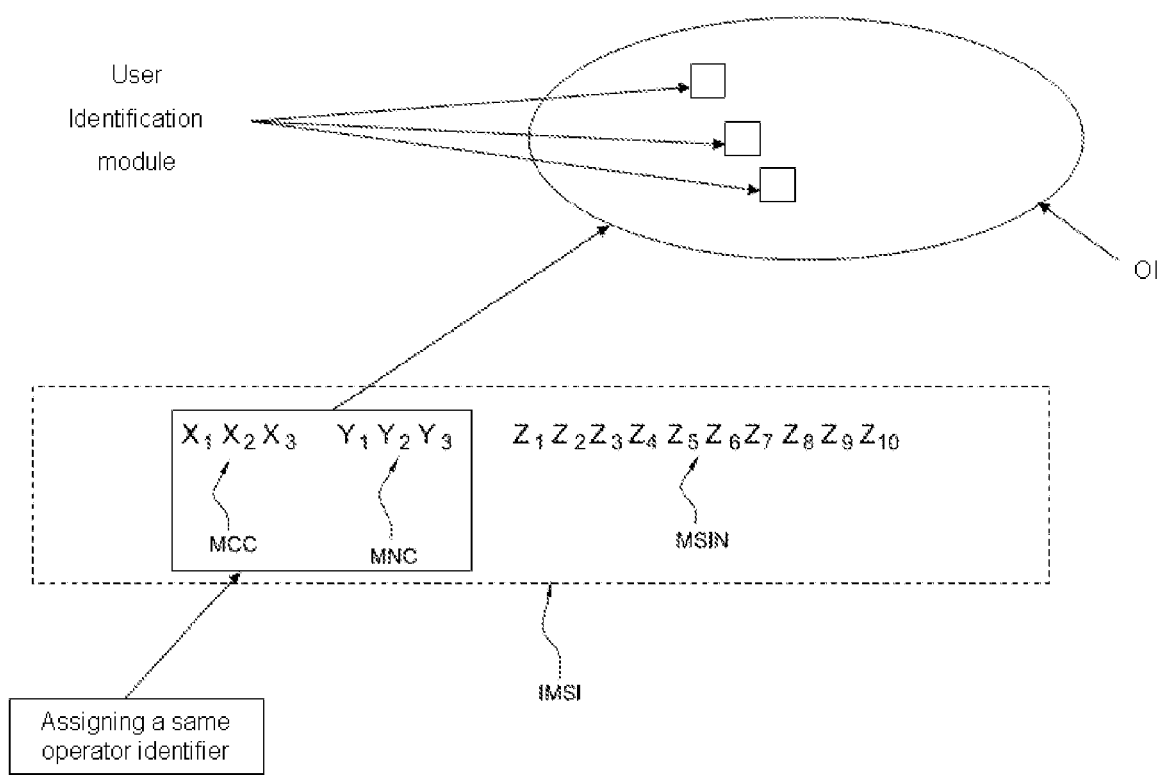

METHOD OF CONFIGURING MODULES FOR IDENTIFYING USERS OF A TELECOMMUNICATION NETWORK

CROSS REFERENCE TO RELATED APPLICATIONS

This application is the U.S. National Stage of PCT/EP2011/052860, filed Feb. 25, 2011, which in turn claims priority to French Patent Application No. 1053013, filed Apr. 20, 2010, the contents of all applications are incorporated herein by reference in their entireties.

The present invention is situated in the telecommunications field and more specifically relates to a method of configuring modules for identifying users of a telecommunication network whose national operator identification is recognized at the worldwide level through a standard for the purposes of mobility. More particularly, it is registered in 3GPP (GSM, UMTS, LTE, and future technologies), IEEE such as, for example, WiMAX (802.16) or WIFI (802.11) technologies, 3GPP2 (CDMA) or else TETRA, P25, etc., type standards.

The invention finds a particularly interesting application in the case of PMR (Professional Mobile Radiocommunications) professional radiocommunication networks, and more particularly concerning the use of broadband telecommunication technologies.

In a known manner, each user of a PLMN (Public Land Mobile Network) public mobile telecommunication network currently has an identification module of the SIM (Subscriber Identity Module) card type in which an identifier such as an IMSI (International Mobile Subscriber Identity) identifier is stored. The syntax of the IMSI identifier is described in the ITU-T E.212 standard issued by the ITU (International Telecommunication Union). This public network may be a second generation cellular network of the GSM (Global System for Mobile communications) or GPRS (Global Packet Radio Service) type, a third generation network such as UMTS (Universal Mobile Telecommunications System) networks, or a fourth generation network of the LTE (Long Term Evolution) type defined by the 3GPP (for 3rd Generation Partnership Project) standard.

The IMSI identifier is composed in the following manner:
  a 3-digit MCC (Mobile Country Code) code corresponding to the code of the country;
  a 2- or 3-digit MNC (Mobile Network Code) code corresponding to the code of the operator;
  a 10 or fewer digit MSIN (Mobile Subscriber Identification Number) code corresponding to the number of the subscriber inside the network.

The MCC and MNC codes are allocated statically (cf. ITU-T E 212 for networks of the 3GPP type, ITU-T 218 for networks of the trunk (i.e., TETRA for Trans European Trunked Radio) type or else IEEE for networks of the WiMAX type.

In addition, a user is associated with an operator and has a unique location register better known by the term "HOME." The user may also have several rights of access as a visitor; access as a visitor depends on roaming agreements or on the subscription chosen.

A user identifier (of the IMSI type) may not be common to two countries, since the user identifier contains the MCC/MNC or Operator Id code that is unique at the international level. Therefore, an IMSI code is unique at the international level.

In addition, professional radiocommunication systems called PMR (for "Professional Mobile Radiocommunications") systems of the TETRA (Trans European Trunked Radio) or TETRAPOL type, defined by the industrial forum TETRAPOL (http://www.tetrapol.com) or else of the P25 type defined by the "Telecommunications Industry Association (TIA)" for the "Association of Public-Safety Communications Officers (APCO)" are known. PMR networks are independent mobile communication networks dedicated for the use of companies or administrations, particularly to ensure public safety or industrial safety or to intervene in transport activities. PMR networks are largely utilized by public safety services (police forces and national police, for example) and emergency services, and also by many other user categories (public transport, airports, etc.). These are private networks that present a high level of security. Current PMR networks, based on the technologies cited above, are known as narrowband networks, characterized by a channel width on the order of about ten kilohertz (kHz).

The evolution of telecommunications networks and the rise of high bandwidth encourage PMR systems users to demand applications that are still more advanced, necessitating a higher bandwidth. Consequently, it is important to be able to make PMR systems evolve to the highest broadband widths, for example by implementing a broadband technology (for example of the LTE (Long Term Evolution) or WiMAX (Worldwide Interoperability for Microwave Access) type); Such systems will consequently respond to an identification system defined according to the ITU-T E.212 standard. It follows that an IMSI identifier must be assigned to each user of a PMR network.

Such being the case, PMR systems are likely to find particularly interesting applications concerning international organizations such as NATO (North Atlantic Treaty Organization) or regional organizations such as ESA (European Space Agency), that bring many countries together. Such applications give rise to a need for communication going beyond national borders.

By way of example, the main mission of NATO consists of maintaining the peace between its various members. Thus, it sometimes happens that some of its members, for example, from different countries and/or different categories (military and NGO, for example), are called to intervene in a specific mission in a foreign country. Because of this, if one applies an identification system defined according to the ITU-T E.212 standard, a PMR or French military member, identifiable by means of an MNC code from a French operator, participating in NATO missions and intervening in New Zealand may not be recognized as "HOME" with his MNC value.

Similarly, no IMSI value currently assigned enables mobile international or even transboundary missions with users coming from different countries to be fulfilled.

In this context, the invention aims to propose a method of assigning IMSI identifiers according to the ITU-T E.212 standard in a PMR type network, by considering the specificities of organizations or missions having regional or international objectives, particularly concerning mobile missions.

For this purpose, the invention applies to a method of configuring modules for identifying users of a telecommunication network able to cover a service area cut into a plurality of geographical sub areas, each identification module comprising an identification code stored in said identification module, said identification code comprising:
  an operator identifier;
  a user identification number;
  Said method being characterized in that the method comprises a step of assigning a same operator identifier for a plurality of user identification modules belonging to a same organization or international mission.

Generally, one starts by affiliating MCC type international codes with international scope for organizations or international missions (for example an MCC code for the EU, another for NATO or an international MCC code for a given international mission).

Then, each international operator performs engineering either by using several MCC (in the case of several MCC per organization) or several MNC may each be associated with a mission.

Thanks to the method of the invention, a unique operator identifier may be used for all members participating in a mission organized by a same organization; Thus the operator identifier is not connected to a country or a region but this operator identifier is directly associated with an organization or international mission.

In general, this operator identifier is assigned by the ITU to the organization that may then use it as it chooses. This particularity enables a French member, belonging to a specific organization A, to intervene in a mission in New Zealand organized by said organization A. The French member will then be recognized by the telecommunication network as a user belonging to the mission organized by A by means of his operator identifier. Similarly, an American member having the same operator identifier will be recognized by the telecommunication network as a user belonging to this same mission. In this case, the French and American members are associated as "HOME" with this operator identifier for their mission within the organization.

Advantageously, the operator identifier is assigned to a plurality of user identification modules belonging to a same international mobile mission.

It will be noted that missions are most often temporary; once the mission is accomplished, the organization may assign the operator identifier to another mission.

According to a possible variant, a user may also be considered a visitor (i.e., not recognized as a member of the network) when he is found in a geographical area other than his own. In this case, the user must have access rights connected to a roaming type agreement between the organization and the operator of the network where he is found.

According to a particularly interesting embodiment of the method of the invention, said operator identifier comprises:
 an MCC code, a same MCC code being assigned for a plurality of user identification modules belonging to an organization or a same international mission;
 an MNC code (for example, comprising three digits).

In an additional embodiment of the method according to the invention, said method comprises a step of selecting by said organization an MNC code for a specific mission from among a plurality of MNC codes that have been assigned to it.

According to a variant of embodiment, the method comprises, for an international mission associated with an MCC code, a step of selecting an MNC code for a particular organization from among a plurality of MNC codes associated with said MCC code.

Advantageously, said method comprises a step of assigning at least one operator identifier to said organization, said operator identifier being capable of being used by said organization for temporary missions, said operator identifier being assigned to the modules for identifying users participating in the mission. A same operator identifier may, for example, be used for a mission located in Haiti and then be reused later for a mission in Africa. This operator identifier is assigned by the ITU to the organization.

Advantageously, said operator identifier comprises:
 an MCC code, a same MCC code being assigned for a plurality of modules for identifying users belonging to a same organization or international mission;
 an MNC code;
Said method comprising a step of assigning one or more MCC codes to said organization or to said international mission.

In addition to the principal characteristics that have just been mentioned in the previous paragraph, the method of configuring modules for identifying users of a telecommunication network according to the invention may present one or more of the additional characteristics below, considered individually or according to all technically feasible combinations:
 said same operator identifier is reusable for missions situated in different geographic areas;
 said telecommunication network is a PMR network;
 said user identification code stored in said identification module responds to a syntax such as defined in one of the following standards:
  ITU-T E212;
  ITU-T E218; or
  IEEE.

Another object of the present invention is a user terminal comprising a user identification code configured by a method in conformance with the invention.

Other characteristics and advantages of the invention will clearly emerge from the description that is given below, for indicative and in no way limiting purposes, with reference to FIG. 1 that illustrates the syntax of a user identification code configured by a method in conformance with the invention.

The invention applies to a method of configuring modules for identifying users of a telecommunication network able to cover a service area. As an illustration, three members of a same international organization IO are situated in different locations in the international territory. More particularly, in the example described below, the three members of the international organization IO are constituted of:
 an American member situated in the American territory;
 a French member situated in the French territory; and
 an Australian member situated in the Australian territory.

Each user (or member) of the telecommunication network comprises an identification code stored in the identification module. By way of a non-limiting example, for the rest of the description, the identification code is formed by an IMSI identification code whose syntax responds to the ITU-T E.212 standard issued by the ITU (International Telecommunication Union).

The structure of the IMSI identification code is represented in FIG. 1. The IMSI identification code comprises:
 an MCC identification code, first field of the IMSI code, with a length of three digits;
 an MNC code, second field of the IMSI code, with a length of two or three digits (three in the example illustrated in FIG. 1);
 an identification number (or code) of the MSIN user, third field of the IMSI code, with a maximum length of 10 digits.

According to a non-limiting example of embodiment, the method according to the invention comprises a step of assigning a same international operator identifier (MCC code and MNC code) for a plurality of modules for identifying users (or members) belonging to a same organization (in the example, the international organization IO). Thus, in ITU E212 mode, a concept of international Plmn_Id or international operator identifier is created.

Here, at least one MCC code (associated with one or more MNC values) is assigned by the ITU (International Telecommunication Union) for a specific organization. It is an international and inter-organizational identifier.

In other words, the three American, French and Australian members belonging to this international organization IO have the same MCC/MNC (or international type Plmn_Id) identification code. This MCC/MNC code enables its possessors to use a PMR network during a common mission organized by the international organization IO.

At the same time as a unique MCC code is assigned by the ITU to the international organization IO, one or more MNC codes are assigned to the international organization IO: This MNC code or these MNC codes will be used by the international organization IO according to its needs.

The international organization IO may be invested with a humanitarian aid mission consisting, for example, of intervening in a Brazilian site that had undergone an earthquake. According to such an implementation, the three members comprise a same MCC (organization)+MNC (temporary mission) pair and are considered to be "HOME" by the PMR network in Brazil; Therefore they may go to the Brazilian site to carry out this humanitarian aid mission and use the same telecommunication network. In fact, the three members will be recognized by the telecommunication network as "HOME" belonging to the international organization IO mission by means of their MCC code identifying the organization and their MNC code identifying the mission.

Once the Brazilian humanitarian aid mission is accomplished, the organization may assign the MNC code to another mission that may, for example, take place in Australia.

According to this first embodiment, the MCC code remains unchanged to the extent that it identifies the organization, multiple MNC codes being used by the operator for the missions.

In addition, during a mission, a member of an organization may use a public telecommunication network if a prior roaming type interoperator mobility agreement exists, giving the member access rights to this network. In this case, the user is considered to be a visitor in the public telecommunication network.

In addition, when this member intervenes in a mission situated in a frontier zone between two countries such as, for example, Canada and the United States, he may use both a Canadian public telecommunication network and an American public telecommunication network if a roaming agreement between his organization and the Canadian public telecommunication network and a roaming agreement between his organization and the American public telecommunication network exist.

The invention is described above by way of example, it is understood that the person skilled in the art is able to carry out different variations of the method of configuring modules for identifying users of a telecommunication network, particularly relating to the type of identification code from the time that a same operator identifier is assigned to a plurality of modules for identifying users belonging to a same organization.

Generally, the method according to the invention consists of affiliating one or more MCC with international scope with an organization or an international mission. Then, cutting between international operators may be carried out at the level of the use of multiple MNC (for example, an MCC for NATO and a range of MNC for the different NATO missions) or at the level of use with an international MCC code for international missions with different MNC codes for different organizations.

The invention claimed is:

1. A method of configuring identification modules for identifying users of a telecommunication network able to cover a service area, each identification module comprising an identification code stored in said identification module, said identification code comprising:
   an operator identifier comprising a MCC code and a MNC code;
   a user identification number;
   the method comprising:
   assigning a same MCC code to a plurality of user identification modules associated with different organizations for identifying users belonging to a same international mission, and
   selecting a MNC code, for a particular organization among the different organizations, from among a plurality of MNC codes associated with said MCC code.

2. The method according to claim 1, wherein the operator identifier is assigned to a plurality of modules for identifying users belonging to a same international mobile mission.

3. The method according to claim 1, wherein said MNC code comprises three digits.

4. The method according to claim 1, comprising assigning at least one operator identifier to an organization, said operator identifier being capable of being used by said organization for temporary missions, said operator identifier being assigned to modules for identifying users participating in the mission.

5. The method according to claim 4, wherein said same operator identifier is reusable for missions situated in different geographic areas.

6. The method according to claim 1, wherein said telecommunication network is a PMR network.

7. The method according to claim 1, wherein said identification code stored in said identification code responds to syntax defined in one of the following standards:
   ITU-T E212;
   ITU-T E218; or
   IEEE.

8. A user terminal comprising an identification code configured by a method according to claim 1.

* * * * *